Patented May 31, 1927.

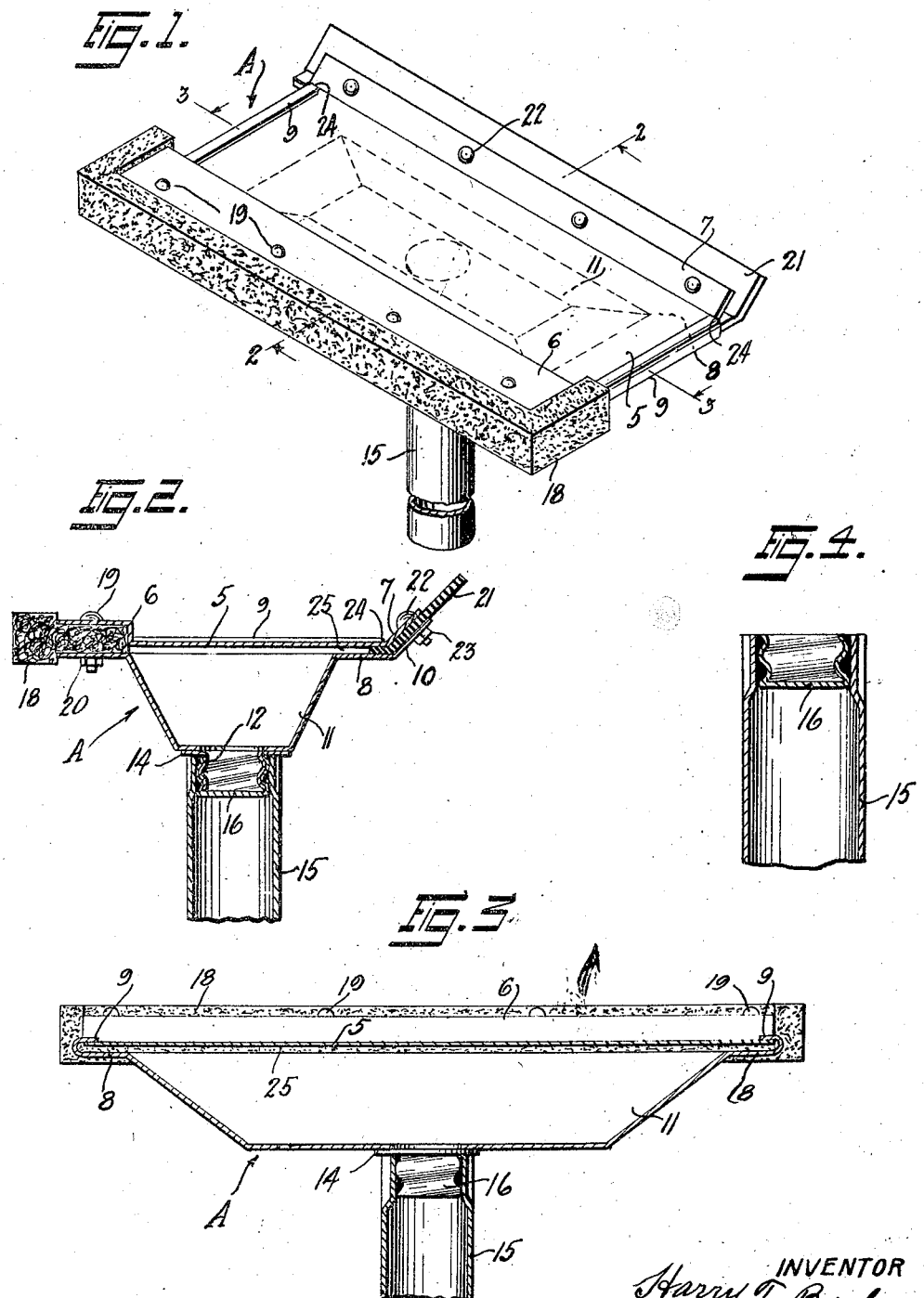

1,630,463

UNITED STATES PATENT OFFICE.

HARRY T. BARLOW, OF BROOKLYN, NEW YORK, ASSIGNOR TO WONDER WINDOW WASHER CORP., OF NEW YORK. N. Y., A CORPORATION OF NEW YORK.

WINDOW-CLEANING DEVICE.

Application filed December 3, 1926. Serial No. 152,328.

This invention relates to devices for cleaning windows, woodwork and the like and has for one of its chief objects the provision of a combined squeegee, reservoir and moistener.

Another important object of the invention is the provision of an article of this nature that is leak proof.

A further object of the invention is the provision of an article of this nature that is efficient, inexpensive and yet substantial in construction.

Other objects and novel features of construction will become more apparent as the specification proceeds.

Referring to the drawings forming a part of this specification:

Figure 1 is a perspective view of one embodiment of my invention.

Figure 2 is a sectional view taken on line 2—2, Fig. 1.

Figure 3 is a sectional view taken on line 3—3, Fig. 1 and

Figure 4 is a view in section of a portion of the combined handle and reservoir stopper.

Referring now in detail to the drawings in which like numerals denote the same parts throughout the several views, A indicates a receptacle made of any suitable material having a plate 5 which is provided at one end thereof with a rectangular offset portion 6 and an angularly disposed wall or projection 7 at its opposite end. Parallel to and spaced apart from the plate 5 is a second plate 8. This plate 8 has at its oppositely disposed longitudinal ends, portions or ears 9 overlapping and soldered to the plate 5 and is also provided with an angularly disposed wall 10 parallel to and spaced apart from the wall 7 of the plate 5.

The plate 8 is further provided with a depression forming a chamber or reservoir 11 adapted to contain any cleaning fluid or liquid such as water or the like. At the bottom of and at the center of the chamber 11 there is provided a threaded nozzle or stem 12 having a flanged seat 14 which is soldered or otherwise secured to the outer surface of the depression or reservoir 11 and is adapted to receive thereon a tubular handle 15 reduced at one end thereof and provided with a screw threaded cap 16 closed at one end thereof to form a closure or stopper for the reservoir 11.

Between the offset portion 6 of the plate 5 and the plate 8 I provide a moistener 18 made of suitable material such as felt or the like and suitably secured between the said plates by screws 19 and nuts 20. By referring to Figs. 2 and 3 of the drawings, it will be seen that this moistener is in direct communication with the reservoir 11. A rubber squeegee 21 is suitably secured between the angular walls 7 and 10 by means of screws 22 and nuts 23. It will also be seen by referring to Fig. 2 that the squeegee 21 extends inwardly and beyond the edges 24 of the ears 9 into the space 25 formed between the plates 5 and 8 and thus prevents any of the liquid from leaking out at this end. It may here be stated that the moistener 18 will only absorb sufficient liquid to moisten the object being cleaned. A broom or mop handle or the like may be inserted into the tube 15 if it is desired to clean anything out of the ordinary reach.

To operate the device, the reservoir is first filled with water or the like and the handle 15 is secured in place. The device is then tilted as desired and sufficient liquid will trickle through the moistener to moisten the surface of the article being cleaned, which may then be dried by passing the squeegee over it.

From the foregoing it will be seen that I have provided an efficient and leak-proof cleaning device which will both moisten and dry any article in the nature of woodwork, windows and the like, and one that is substantially and inexpensively constructed.

In the drawings forming a part of this specification. I have shown a preferred form of my invention but I do not limit myself to the exact form shown and described, as many modifications and changes may be made without departing from the scope of the appended claims.

Having described my invention, what I claim as new is:

1. A cleaning device, comprising a plate, a second dished plate fixed to and spaced apart from the said first mentioned plate forming a reservoir adapted to contain liquid, an absorbent conducting member between the said plates at one edge of the device in communication with the reservoir, a gasket between the said plates at the opposite edge of the device extending into the interior thereof to prevent any leakage of the liquid therein; a hollow stem in communication with the reservoir, a handle removably secured to the reservoir, and a sealing member secured to the handle to seal the reservoir.

2. A cleaning device, comprising a plate, a second dished plate fixed to and spaced apart from the said first mentioned plate forming a reservoir adapted to contain liquid, an absorbent conducting member between the said plates at one edge of the device in communication with the reservoir, a gasket between the said plates at the opposite edge of the device extending into the interior thereof to prevent any leakage of the liquid therein, a screw threaded hollow stem in communication with the reservoir through which the reservoir is adapted to be filled with liquid, and a hand provided with a screw threaded member at one end thereof removably secured to the stem and adapted to seal same.

HARRY T. BARLOW.